(12) United States Patent
Deciry et al.

(10) Patent No.: US 6,530,545 B2
(45) Date of Patent: Mar. 11, 2003

(54) SUSPENSION BRACKET

(75) Inventors: James Deciry, Compiegne (FR); Michel Durin, Fontenay-le-Fleury (FR)

(73) Assignee: Krieg & Zivy Industries, Chevrieres (FR)

(*) Notice: Subject to any disclaimer, the term of this patent is extended or adjusted under 35 U.S.C. 154(b) by 0 days.

(21) Appl. No.: 09/973,722

(22) Filed: Oct. 11, 2001

(65) Prior Publication Data

US 2002/0047073 A1 Apr. 25, 2002

(30) Foreign Application Priority Data

Oct. 11, 2000 (FR) .................................. 00 13007

(51) Int. Cl.[7] ................................. F16L 3/00

(52) U.S. Cl. ........................ 248/49; 248/56; 248/61; 403/397

(58) Field of Search .............. 248/49, 692, 218.4, 248/219.1, 221.11, 222.13, 222.51, 225.11, 225.21, 304, 301, 227.3, 339, 340, 58, 215, 56, 61; 403/397

(56) References Cited

U.S. PATENT DOCUMENTS

| | | | | | |
|---|---|---|---|---|---|
| 810,004 | A | * | 1/1906 | Tabler | 248/61 |
| 2,657,443 | A | * | 11/1953 | Hartman | 248/56 |
| 2,697,862 | A | * | 12/1954 | Flora | 248/56 |
| 2,733,290 | A | * | 1/1956 | Valiulis | 174/164 |
| 2,968,850 | A | * | 1/1961 | Tinnerman | 403/397 |
| 3,004,370 | A | * | 10/1961 | Tinnerman | 52/719 |
| 3,806,994 | A | * | 4/1974 | Lankford | 403/397 |
| 3,841,196 | A | * | 10/1974 | Tinnerman | 411/523 |
| 4,723,749 | A | * | 2/1988 | Carraro et al. | 248/317 |
| 4,824,057 | A | * | 4/1989 | Suprono | 248/62 |
| 5,316,244 | A | | 5/1994 | Zetena, Jr. | |
| 5,820,168 | A | * | 10/1998 | De Giacomoni | 285/192 |

* cited by examiner

*Primary Examiner*—Anita King
(74) *Attorney, Agent, or Firm*—Young & Thompson

(57) ABSTRACT

A suspension bracket can be mounted on a rod, such as a screwthreaded rod, and has a metal body including a hook-shaped support part and, opposite the support part, a substantially plane fixing part including a notch. At the entry of the notch, a retaining lug upstanding from one of its edges extends obliquely to the plane of the notch at a distance from the opposite edge of the notch, enabling the rod to pass between them.

20 Claims, 2 Drawing Sheets

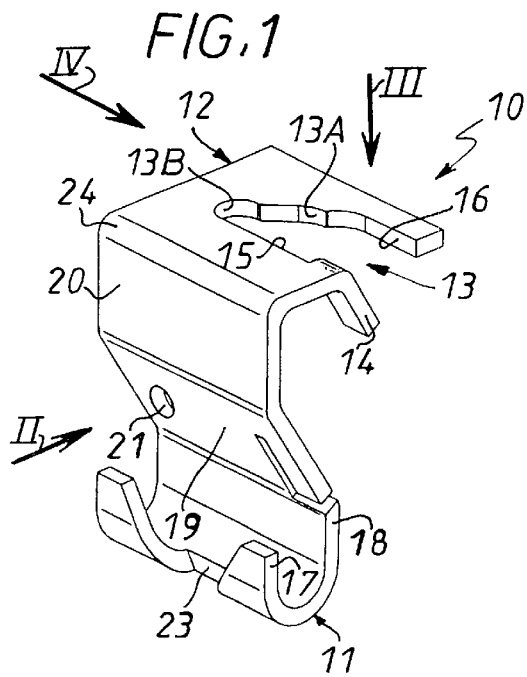
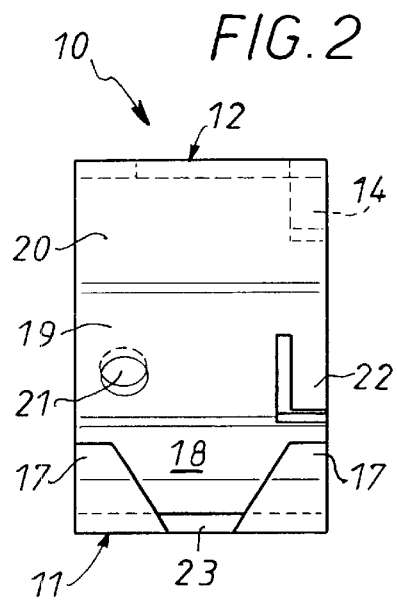
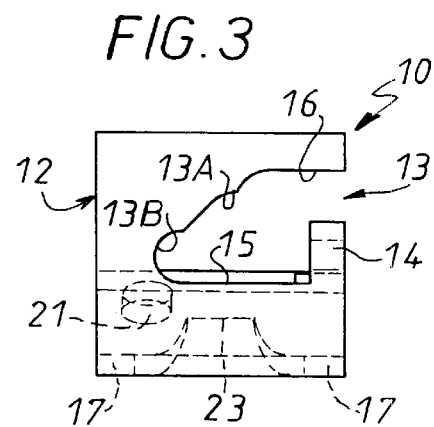
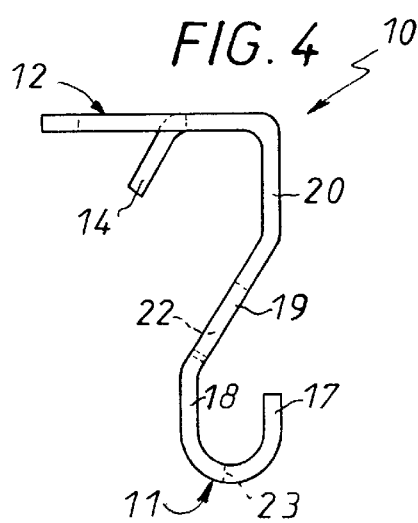
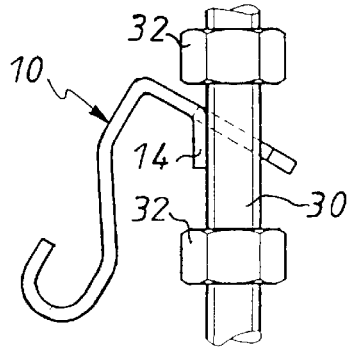
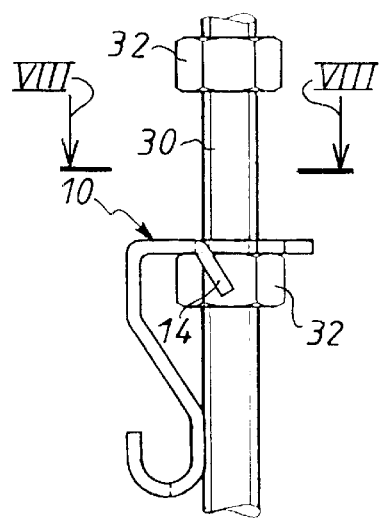
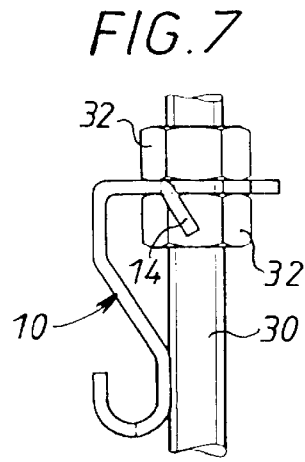

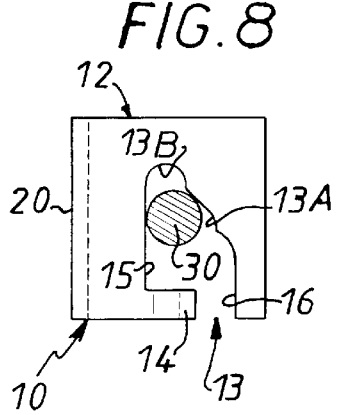
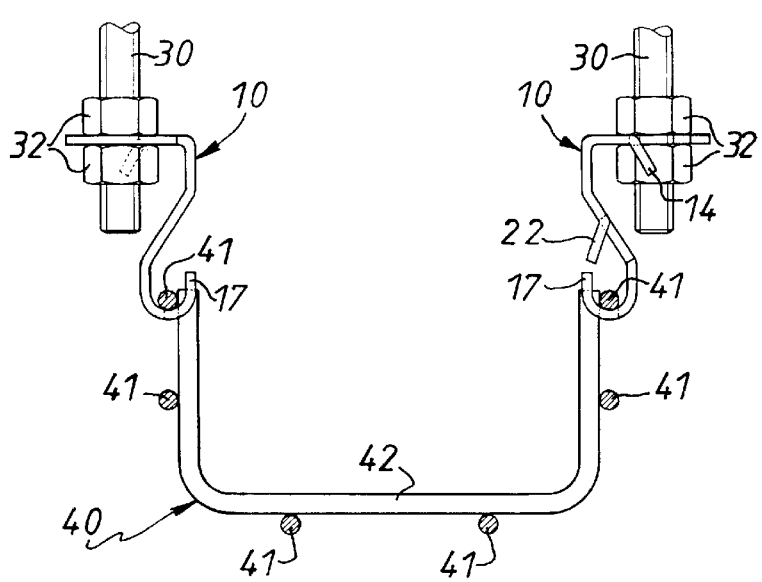
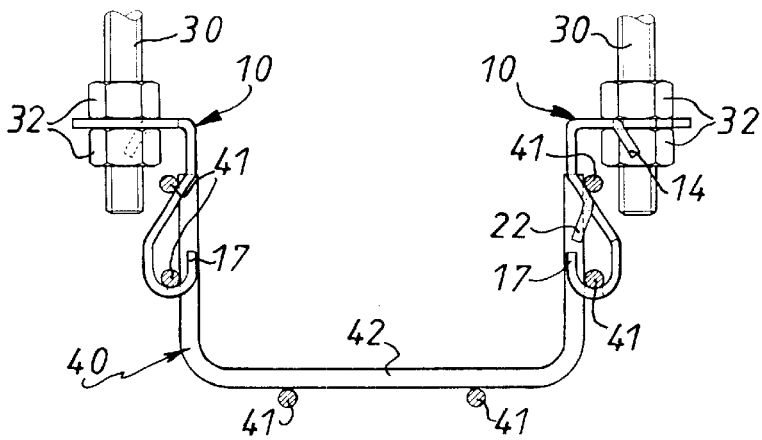
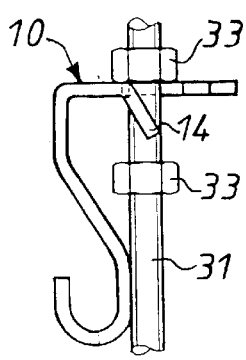
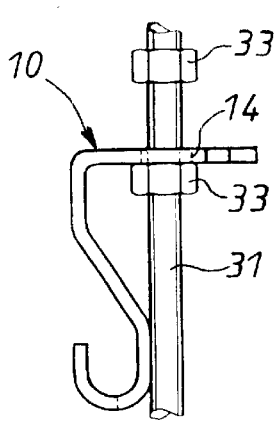
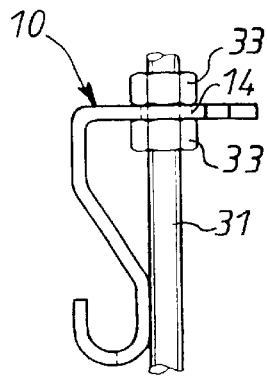

SUSPENSION BRACKET

BACKGROUND OF THE INVENTION

1. Field of the Invention

The present invention relates to a suspension bracket intended to be mounted on a rod, for example a screwthreaded rod, and consisting of a metal body having a hook-shaped support part and, opposite the latter, a fixing part by means of which it is itself fixed.

2. Description of the Prior Art

Brackets of this kind are used to suspend mesh structures, such as wire cable trays, for example, the hook-shaped support part being adapted to receive one of the longitudinal members or wires of said structure.

A prior art bracket of this kind has a substantially plane fixing part in which there is a notch. Because of the notch, by moving the bracket laterally relative to the rod, the bracket can be mounted on a rod that has already been installed, and it is even possible to add this kind of bracket to other existing brackets; because the rod is threaded, all that is required is to fit quick-fix open nuts on either side of the fixing part of the bracket and tighten them; they must be tightened to support the bracket, even if it is not in its final position.

To avoid this problem, it has already been proposed to substitute a hole for the notch, but this requires the fixing part to be threaded over the rod and prevents it being mounted on a screwthreaded rod that has already been installed, to add other brackets thereto.

An object of the present invention is to propose a suspension bracket that can be mounted laterally on a rod that has already been installed and retained thereon of its own accord in a position that need not be its final position, which facilitates fitting the bracket.

SUMMARY OF THE INVENTION

The invention provides a suspension bracket adapted to be mounted on a rod, such as a screwthreaded mad, and consisting of a metal body including a hook-shaped support part and, opposite the support part, a substantially plane fixing part including a notch, in which bracket, at the entry of the notch, a retaining lug upstanding from one of its edges extends obliquely to the plane of the notch at a distance from an opposite edge of the notch enabling the rod to pass between them.

It is advantageous if the hook of the support part is U-shaped and its flanges are perpendicular to the fixing part.

It is preferable if the support part is connected to the fixing part by one of its flanges which is extended by an oblique middle part which is in turn extended by a connecting part parallel to the flanges of the U-shape of the support part.

It is advantageous if the connecting part is aligned with the other flange of the U-shape of he support part, which is referred to as the free flange.

It is preferable if the oblique middle part is parallel to the retaining lug.

It is advantageous if the width of the notch varies.

It is preferable if the notch includes a succession of partial imprints of different diameter rods.

It is advantageous if the notch is asymmetrical and one of its edges is straight and parallel to the flanges of the support part.

It is preferable if the oblique middle part includes a hole.

It is advantageous if the oblique middle part includes a bendable lug obtained by cutting an L-shape into one of its lateral edges.

It is preferable if the retaining lug is deformable into the plane of the fixing part.

An embodiment of the invention shown in the accompanying drawings is described next by way of purely illustrative and non-limiting example in order to explain the object of the invention.

BRIEF DESCRIPTION OF THE DRAWINGS

FIG. 1 is a perspective view showing a suspension bracket according to the invention.

FIG. 2 is a view in the direction of the arrow II in FIG. 1.

FIG. 3 is a view in the direction of the arrow III in FIG. 1.

FIG. 4 is a view in the direction of the arrow IV in FIG. 1.

FIGS. 5 to 7 are elevation views showing the mounting of the bracket shown in FIGS. 1 to 4 on a screwthreaded rod FIG. 8 is a plan view of the bracket of FIG. 1 mounted on a screwthreaded rod.

FIG. 9 shows one application of the suspension bracket according to the invention.

FIG. 10 is analogous to FIG. 9 and shows a different embodiment.

FIGS. 11 to 13 are analogous to FIGS. 5 to 7, with a screwthreaded rod of smaller diameter.

DETAILED DESCRIPTION OF THE PREFERRED EMBODIMENTS

FIGS. 1 to 4 show that a suspension bracket 10 according to the invention has a sheetmetal body that has been cut out and bent to a shape including a support part 11 and a fixing part 12.

The support part 11 is in the form of a U-shaped hook with two flanges 17 and 18; in this embodiment the flange 17, which is referred to as the free flange, as opposed to the flange 18 which connects the support part 11 to the fixing part 12, has a central cut-out 23, but this is not obligatory.

The fixing part 12 is substantially plan and globally perpendicular to the flanges 17, 18 of the support part 11.

The flange 18 of the support part 11 is extended by an oblique middle part 19 which is in turn extended by a connection part 20 parallel to the flanges 17, 18 of the support part 11 and connected directly to the fixing part 12.

In this embodiment the connecting part 20 is aligned with, i.e. in the same plane as, the free flange 17 of the support part 11.

The fixing part 12 includes a notch 13; in the embodiment shown, the notch 13 extends globally transversely in the fixing part 12, i.e. globally parallel to the bend 24 connecting said fixing part 12 to the connecting part 20.

At the entry to the notch 13 is a retaining lug 14 upstanding from one of the edges of the notch 13, here the edge 15, and extending obliquely to the plane of the notch 13.

In the embodiment shown, the fixing part 12 and the support part 11 are on respective opposite sides of the middle part 19 and the connecting part 20, the retaining lug 14 being directed inward, i.e. on the same side of the fixing part 12 as the support part 11.

In the embodiment shown, the retaining lug 14 is parallel to the oblique middle part 19.

The suspension bracket 10 is intended to be mounted on a vertical rod, such as a screwthreaded rod.

The edge 16 of the notch 13, referred to as its opposite edge, and which is opposite the retaining lug 14, and therefore faces the latter, is at a distance from the latter perpendicular to the retaining lug 14 that enables the oblique passage of a screwthreaded rod whose diameter is at most equal to that distance.

Clearly, after it has been fitted over a screwthreaded rod of this kind, in the normal position of the bracket 10, in which the fixing part 12 is perpendicular to the longitudinal axis of the screwthreaded rod, the bracket 10 is retained on the rod, from which it cannot be separated; this is obtained virtually automatically, by the effect of gravity, since, as shown, the support part 11 and fixing part 12 are transversely disposed on respective opposite sides of the middle part 19 and the connecting part 20, the notch 13 being also offset so that it is beyond the plane of the connecting flange 18; in this embodiment the bottom of the notch 13 is practically in line with that plane.

This is shown in FIGS. 5 to 8; in FIG. 5, the notch 13 in the suspension bracket 10 has been "threaded" onto the screwthreaded rod 30 between two nuts 32; when the bracket 10 is released, it assumes the position shown in FIG. 6 due to the effect of gravity; it will be noted that it remains in place vertically by virtue of a lever effect, due to the action of its own weight, the edges of the notch 13 being retained by the thread of the screwthreaded rod 30.

The bracket 10 is retained transversely in this position, as shown in FIG. 8; all that is then required is to tighten the nuts 32 to fix the bracket 10 in its final position (see FIG. 7).

Thus the bracket according to the invention is easier to fit, as already shown, and can be fitted virtually hands free, without special tools.

FIG. 9 shows one embodiment of this kind of suspension bracket 10. In this embodiment, the bracket is used to suspend a wire cable tray 40; as is known in the art, the tray consists of longitudinal wires 41 welded to transverse wires 42 bent to a U-shape to produce a meshed structure in the form of a gutter adapted to receive cables or other filamentary products.

In this embodiment the top longitudinal wires 41, referred to as edge wires, fit into the hook shape of the support part 11 of the suspension bracket 10.

As an alternative to this, as shown in FIG. 10, it is not the edge wires 41 that fit into the hook shape of the bracket, but the second longitudinal wires 41, the edge wires 41 resting on the oblique middle part of the bracket, which improves the seating of the cable tray.

In FIG. 10, the edge wire and the second wire 41 are on respective opposite sides of the oblique middle part; as an alternative to this, they can be on the same side, in which case the cable tray is immobilized vertically in both directions.

As can be seen in FIGS. 1 to 4, the oblique middle part 19 has a lateral lug 22 obtained by cutting an L-shape into one of its lateral edges; bending the lug 22 toward the edge of the free flange 17 of the support part 11 of the suspension bracket 10 traps the longitudinal edge wire 41 mounted in the support part 11 (see FIG. 9), the length of the lug 22 being chosen so that this effect is obtained.

An analogous result can be obtained by inserting a rivet, key, pin or the like, made from a plastics material, for example, into a hole 21 formed in the oblique middle part 19 (see FIGS. 1 and 2).

In the embodiment shown, the width of the notch 13 varies; the notch is asymmetrical; one edge 15 of the notch is straight, and in this embodiment parallel to the flanges 17, 18 of the support part 11, to be more precise parallel to the connecting bend 24, and the other edge is globally inclined relative to the latter; this inclined edge advantageously carries partial imprints rods of different diameter, in this embodiment two such imprints 13A, 13B; the imprint 13A in FIG. 8 corresponds to the The imprint 13B corresponds to a smaller diameter rod 31 shown in FIGS. 11 to 13, which are respectively analogous to FIGS. 5 to 7; in this embodiment, after fitting the bracket to this kind of rod 31 (see FIG. 11), the bracket is retained on the rod by deforming the retaining lug 14 into the plane of the fixing part 12 (see FIG. 12) and securing nuts 33.

What is claimed is:

1. A suspension bracket adapted to be mounted on a rod, the bracket comprising a metal body including,
    a hook-shaped support part and, opposite said support part, a substantially plane fixing part including a notch, and
    a retaining lug, upstanding from an edge of said notch at an entry to said notch, extends obliquely to a plane of said notch at a distance from an opposite edge of said notch enabling said rod to pass obliquely between the edge and the opposite edge while being held parallel to said retaining lug.

2. The suspension bracket claimed in claim 1 wherein said support part is U-shaped with flanges perpendicular to said fixing part.

3. The suspension bracket claimed in claim 2 wherein said support part is connected to said fixing part by one of said flanges which is extended by an oblique middle part which is in turn extended by a connecting part parallel to said flanges.

4. The suspension bracket claimed in claim 3 wherein said connecting part is aligned with the other flange of said U-shape of said support part.

5. The suspension bracket claimed in claim 3 wherein said oblique middle part is parallel to said retaining lug.

6. The suspension bracket claimed in claim 1 wherein the width of said notch varies.

7. The suspension bracket claimed in claim 6 wherein said notch includes a succession of partial imprints of different diameter rods.

8. The suspension bracket claimed in claim 6 wherein said notch is asymmetrical and one of said edges is straight and parallel to flanges of said support part.

9. The suspension bracket claimed in claim 3 wherein said oblique middle part includes a hole.

10. The suspension bracket claimed in claim 3 wherein said oblique middle part includes a bendable lug obtained by cutting an L-shape into one of its lateral edges.

11. The suspension bracket claimed in claim 1 wherein said retaining lug is deformable into the plane of said fixing part.

12. A suspension bracket with a metal body that comprises:
    a substantially planar fixing part that has a notch therein;
    a support part with a U-shaped hook that has at least one flange that is perpendicular to said fixing part, said support part being connected to said fixing part by an oblique connecting part that extends obliquely to said fixing part and a parallel connecting part that is parallel to said at least one flange; and
    a retaining lug extending from a first edge of said notch at an entry to said notch, said retaining lug extending obliquely to a plane of said notch and being spaced from a second edge of said notch opposite said first edge so as to permit passage, between said first and second edges, of a rod on which the suspension bracket is to be mounted.

13. The suspension bracket of claim 12, wherein said retaining lug is parallel to said oblique connecting part.

14. The suspension bracket of claim 12, wherein said oblique connecting part comprises an L-shaped cutout for a bendable lug.

15. The suspension bracket of claim 12, wherein said notch is asymmetrical and said first edge of said notch is straight and said second edge comprises actuate parts with different diameters.

16. A suspension bracket with a metal body that comprises:

a substantially planar fixing part that has a notch therein;

a hook-shaped support part connected to said fixing part, said hook-shaped support part having at least one flange; and a retaining lug extending from a first edge of said notch at an entry to said notch, said retaining lug extending obliquely to a plane of said notch and being spaced from a second edge of said notch opposite said first edge so as to permit passage, between said first and second edges, of a rod on which the suspension bracket is to be mounted, wherein said notch is asymmetrical and has a width that varies, one edge of said first and second edges being straight and parallel to said at least one flange.

17. The suspension bracket of claim 16, wherein said at least one flange is perpendicular to said fixing part, said support part being connected to said fixing part by an oblique connecting part that extends obliquely to said fixing part and a parallel connecting part that is parallel to said at least one flange.

18. The suspension bracket of claim 17, wherein said retaining lug is parallel to said oblique connecting part.

19. The suspension bracket of claim 17, wherein said oblique connecting part comprises an L-shaped cutout for a bendable lug.

20. The suspension bracket of claim 16, wherein said first edge of said notch is straight and said second edge comprises actuate parts with different diameters.

* * * * *